US010477535B2

(12) United States Patent
Yang et al.

(10) Patent No.: US 10,477,535 B2
(45) Date of Patent: Nov. 12, 2019

(54) METHOD FOR TRANSMITTING SIGNAL FOR IMPROVING COVERAGE AND APPARATUS FOR SAME

(71) Applicant: LG Electronics Inc., Seoul (KR)

(72) Inventors: Suckchel Yang, Seoul (KR); Yunjung Yi, Seoul (KR); Hyangsun You, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/891,743

(22) Filed: Feb. 8, 2018

(65) Prior Publication Data

US 2018/0167923 A1 Jun. 14, 2018

Related U.S. Application Data

(63) Continuation of application No. 14/889,365, filed as application No. PCT/KR2014/004419 on May 16, 2014, now Pat. No. 9,974,068.

(Continued)

(51) Int. Cl.
*H04W 72/04* (2009.01)
*H04W 4/70* (2018.01)
(Continued)

(52) U.S. Cl.
CPC ....... *H04W 72/042* (2013.01); *H04L 27/2627* (2013.01); *H04W 4/70* (2018.02);
(Continued)

(58) Field of Classification Search
CPC .. H04L 27/2627; H04W 48/16; H04W 4/005; H04W 56/0015; H04W 72/005; H04W 72/042
(Continued)

(56) References Cited

U.S. PATENT DOCUMENTS

2010/0165847 A1* 7/2010 Kamuf .................. H04L 5/0007
370/241
2011/0064037 A1* 3/2011 Wei ...................... H04L 5/0035
370/329
(Continued)

FOREIGN PATENT DOCUMENTS

CN 101877865 A 11/2010
CN 102291744 A 12/2011
(Continued)

OTHER PUBLICATIONS

MediaTek Inc.: "Coverage Analysis of PBCH and System Information Transmission for MTC UEs", 3GPP TSG-RAN WG1 #72bis, R1-131179, Apr. 14-19, 2013.
(Continued)

*Primary Examiner* — Stephen J Clawson
(74) *Attorney, Agent, or Firm* — Dentons US LLP

(57) ABSTRACT

The present invention relates to a wireless communication system. In particular, the present invention relates to a method and an apparatus for receiving data, by a terminal, in a wireless communication system, the method comprising the steps of: receiving a PDCCH; receiving a PDSCH corresponding to the PDCCH in a subframe including CSI-RS resource available in a cell; and demodulating the PDSCH. If a predetermined condition is satisfied, demodulation of the PDSCH is performed on the assumption that the PDSCH is not transmitted in the CSI-RS resource available in the cell, and if the predetermined condition is not satisfied, the demodulation of the PDSCH is performed on the assumption that the PDSCH can be transmitted in the CSI-RS resources available in the cell.

14 Claims, 13 Drawing Sheets

Related U.S. Application Data

(60) Provisional application No. 61/939,288, filed on Feb. 13, 2014, provisional application No. 61/936,896, filed on Feb. 7, 2014, provisional application No. 61/902,811, filed on Nov. 12, 2013, provisional application No. 61/900,319, filed on Nov. 5, 2013, provisional application No. 61/897,198, filed on Oct. 29, 2013, provisional application No. 61/886,682, filed on Oct. 4, 2013, provisional application No. 61/883,988, filed on Sep. 27, 2013, provisional application No. 61/866,556, filed on Aug. 16, 2013, provisional application No. 61/863,410, filed on Aug. 7, 2013, provisional application No. 61/862,525, filed on Aug. 6, 2013, provisional application No. 61/861,974, filed on Aug. 3, 2013, provisional application No. 61/823,927, filed on May 16, 2013.

(51) Int. Cl.
*H04W 56/00* (2009.01)
*H04W 48/16* (2009.01)
*H04L 27/26* (2006.01)
*H04W 72/00* (2009.01)

(52) U.S. Cl.
CPC ....... *H04W 48/16* (2013.01); *H04W 56/0015* (2013.01); *H04W 72/005* (2013.01)

(58) Field of Classification Search
USPC .......................................................... 370/329
See application file for complete search history.

(56) References Cited

U.S. PATENT DOCUMENTS

| | | | |
|---|---|---|---|
| 2012/0300732 A1 | 11/2012 | Ode | |
| 2013/0083753 A1 | 4/2013 | Lee | H04W 72/0453 370/329 |
| 2013/0223323 A1* | 8/2013 | Jang | H04W 52/0216 370/312 |
| 2013/0242882 A1* | 9/2013 | Blankenship | H04W 72/042 370/329 |
| 2013/0272215 A1 | 10/2013 | Khoryaev et al. | |
| 2014/0071957 A1 | 3/2014 | Xu et al. | |
| 2015/0181560 A1 | 6/2015 | Jamadagni et al. | |
| 2015/0249941 A1 | 9/2015 | Wang et al. | |
| 2016/0057708 A1 | 2/2016 | Siomina | H04W 52/243 455/452.2 |
| 2016/0197690 A1 | 7/2016 | Li | H04L 25/0224 370/278 |

FOREIGN PATENT DOCUMENTS

| | | |
|---|---|---|
| CN | 102804657 A | 11/2012 |
| EP | 2124488 A1 | 11/2009 |
| EP | 2592889 A2 | 5/2013 |
| EP | 2706687 A2 | 3/2014 |
| EP | 2765724 A2 | 8/2014 |
| KR | 10-2010-0137357 A | 12/2010 |
| KR | 10-2012-0051635 A | 5/2012 |
| KR | 1020120041932 A | 5/2012 |
| KR | 10-2012-0089254 A | 8/2012 |
| KR | 1020130040699 A | 4/2013 |
| WO | 2009020178 A1 | 11/2010 |
| WO | 2011157071 A1 | 12/2011 |
| WO | 2012150836 A2 | 11/2012 |
| WO | 2013-022244 A2 | 2/2013 |
| WO | 2013-058502 A1 | 4/2013 |
| WO | 2013055078 A2 | 4/2013 |

OTHER PUBLICATIONS

Huawei, HiSilicon: "Text proposal for PBCH coverage improvement for MTC", 3GPP TSG RAN WG1 Meeting #72b, R1-131819, Apr. 15-19, 2013.

* cited by examiner

* Demodulation of PDSCH is performed on the assumption that PDSCH is not transmitted in CSI-RS resource available in cell when predetermined conditions are satisfied.
* Demodulation of PDSCH is performed on the assumption that PDSCH can be transmitted in CSI-RS resources available in cell when predetermined conditions are not satisfied.

METHOD FOR TRANSMITTING SIGNAL FOR IMPROVING COVERAGE AND APPARATUS FOR SAME

This application is a Continuation Application of U.S. patent application Ser. No. 14/889,365 filed Nov. 5, 2015, which is a 35 USC § 371 National Stage Entry of International Application No. PCT/KR2014/ 004419 filed May 16, 2014, which claims benefit of and priority to U.S. Provisional Application Nos. 61/823,927 filed May 16, 2013, 61/861,974 filed Aug. 3, 2013, 61/862,525 filed Aug. 6, 2013, 61/863,410 filed Aug. 7, 2013, 61/866,556 filed Aug. 16, 2013, 61/883,988 filed Sep. 27, 2013, 61/886,682 filed Oct. 4, 2013, 61/897,198 filed Oct. 29, 2013, 61/900,319 filed Nov. 5, 2013, 61/902,811 filed Nov. 12, 2013, 61/936, 896 filed Feb. 7, 2014, 61/939,288 filed Feb. 13, 2014, all of which are incorporated by reference for all purposes as if fully set forth herein.

TECHNICAL FIELD

The present invention relates to a method for improving coverage in a wireless communication system and an apparatus for the same and, more particularly, to a signal transmission method for improving machine type communication (MTC) coverage, a signaling method and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system. In a wireless communication system, a terminal can receive information through downlink (DL) and transmit information through uplink (UL). Information transmitted or received by the terminal includes data and various types of control information and various physical channels are present according to the type and purpose of information transmitted or received by the terminal.

DISCLOSURE

Technical Problem

An object of the present invention is to provide a method for improving coverage in a wireless communication system and an apparatus for the same. Specifically, an object of the present invention is to provide a signal transmission method for improving MTC coverage, signaling method and an apparatus for the same.

It will be appreciated by persons skilled in the art that that the effects that could be achieved with the present invention are not limited to what has been particularly described hereinabove and other advantages of the present invention will be more clearly understood from the following detailed description.

Technical Solution

According to one aspect of the present invention, a method for receiving data by a UE in a wireless communication system includes: receiving a physical downlink control channel (PDCCH); receiving a physical downlink shared channel (PDSCH) corresponding to the PDCCH in a subframe including a channel state information reference signal (CSI-RS) resource available in a cell; and demodulating the PDSCH, wherein demodulation of the PDSCH is performed on the assumption that the PDSCH is not transmitted in the CSI-RS resource available in the cell when predetermined conditions are satisfied, and demodulation of the PDSCH is performed on the assumption that the PDSCH can be transmitted in the CSI-RS resources available in the cell when the predetermined conditions are not satisfied.

According to another aspect of the present invention, a UE used in a wireless communication system includes: a radio frequency (RF) unit; and a processor, wherein the processor is configured to receive a PDCCH, to receive a PDSCH corresponding to the PDCCH in a subframe including a CSI-RS resource available in a cell and to demodulate the PDSCH, wherein demodulation of the PDSCH is performed on the assumption that the PDSCH is not transmitted in the CSI-RS resource available in the cell when predetermined conditions are satisfied, and demodulation of the PDSCH is performed on the assumption that the PDSCH can be transmitted in the CSI-RS resources available in the cell when the predetermined conditions are not satisfied.

The predetermined conditions may include reception of information indicating that the PDSCH is not transmitted in the CSI-RS resource available in the cell.

The information may be received through the PDCCH.

The predetermined conditions may include the UE being a machine type communication (MTC) UE and repeated transmission of the PDSCH.

Advantageous Effects

According to embodiments of the present invention, it is possible to efficiently enhance coverage in a wireless communication system. Specifically, it is possible to efficiently provide a signal transmission method for improving MTC coverage, a signaling method and an apparatus for the same.

It will be appreciated by persons skilled in the art that that the effects that could be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

While the present invention is described on the basis of LTE-A, the concept or proposed methods and embodiments thereof of the present invention can be applied to other systems (e.g. IEEE 802.16m systems) using multiple carriers without limitation.

Figure 1:
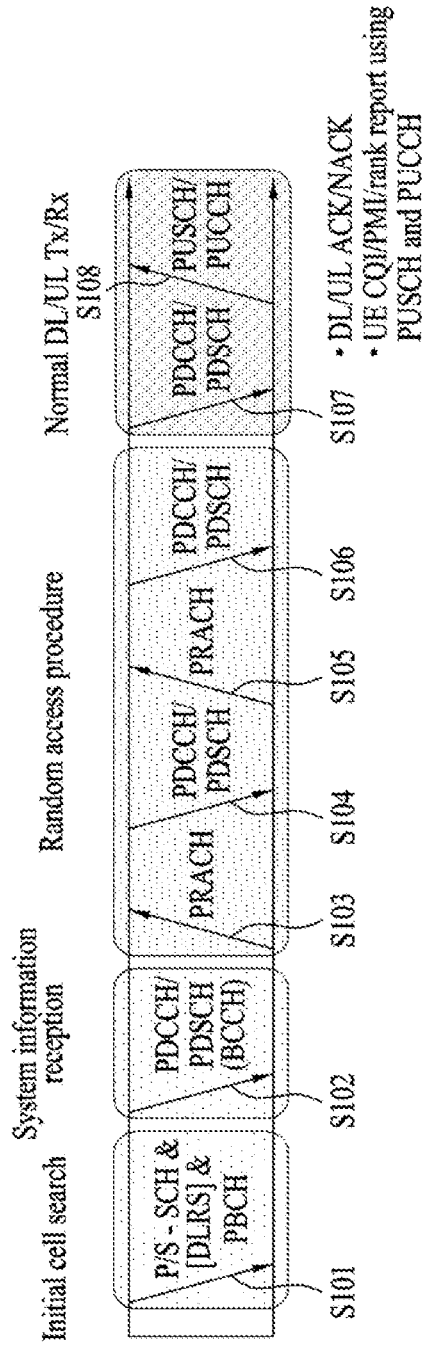
FIG. 1 illustrates physical channels used in LTE-(A) and a signal transmission method using the same.

FIG. 1 illustrates physical channels used in LTE(-A) and a signal transmission method using the same.

Referring to FIG. 1, when powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure.

Figure 2:
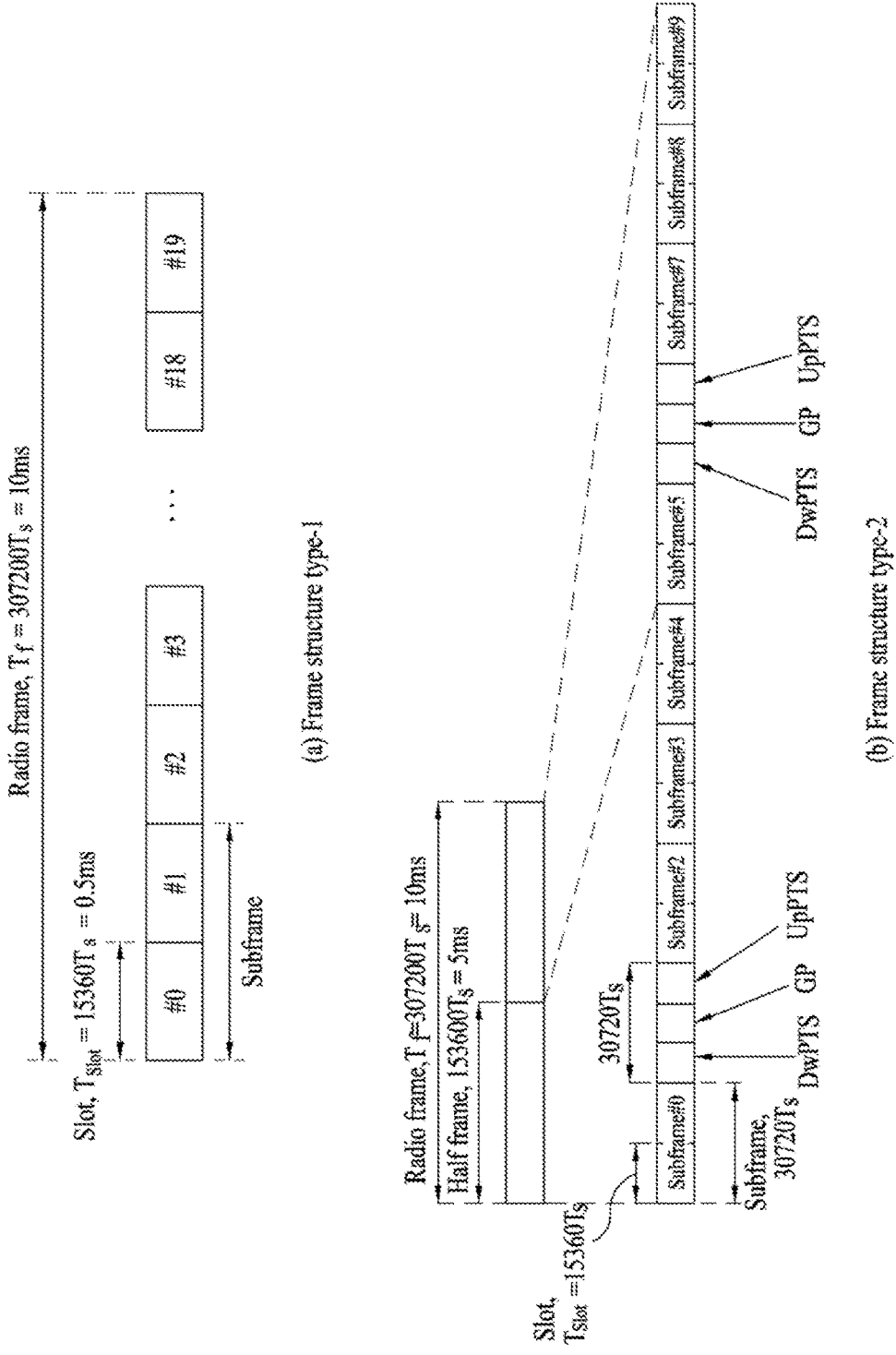
FIG. 2 illustrates a radio frame structure used in LTE-(A)

FIG. 2 illustrates a radio frame structure used in LTE(-A). 3GPP LTE supports a type-1 radio frame structure for FDD (Frequency Division Duplex) and a type-2 radio frame structure for TDD (Time Division Duplex).

FIG. 2(*a*) illustrates a structure of a type-1 radio frame. An FDD radio frame is composed of downlink subframes (SFs) only or uplink subframes only. The radio frame includes 10 subframes each of which is composed of 2 slots in the time domain. A subframe is 1 ms in length and a slot is 0.5 ms in length. The slot includes a plurality of OFDM symbols (downlink) or SC-FDMA symbols (uplink) in the time domain. An OFDM symbol or an SC-FDMA symbol can be simply referred to as a symbol (referred to as sym hereinafter) in the specification unless otherwise mentioned.

FIG. 2(*b*) illustrates a type-2 radio frame structure. The type-2 radio frame includes 2 half frames. Each half frame includes 4(5) normal subframes and 1(0) special subframe. A normal subframe is used on uplink or downlink according to uplink-downlink (UL-DL) configuration. The special subframe includes DwPTS (downlink pilot timeslot), GP (guard period), and UpPTS (uplink pilot timeslot). DwPTS is used for initial cell search, synchronization or channel estimation of a UE. UpPTS is used for channel estimation of a BS and uplink transmission synchronization of a UE. The GP is a period for cancelling interference generated on uplink due to multi-path delay of a downlink signal between uplink and downlink. A subframe includes 2 slots.

Table 1 shows subframe configurations in a radio frame according to UL-DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Here, D denotes a downlink subframe, U denotes an uplink subframe and S denotes a special subframe.

Figure 3:
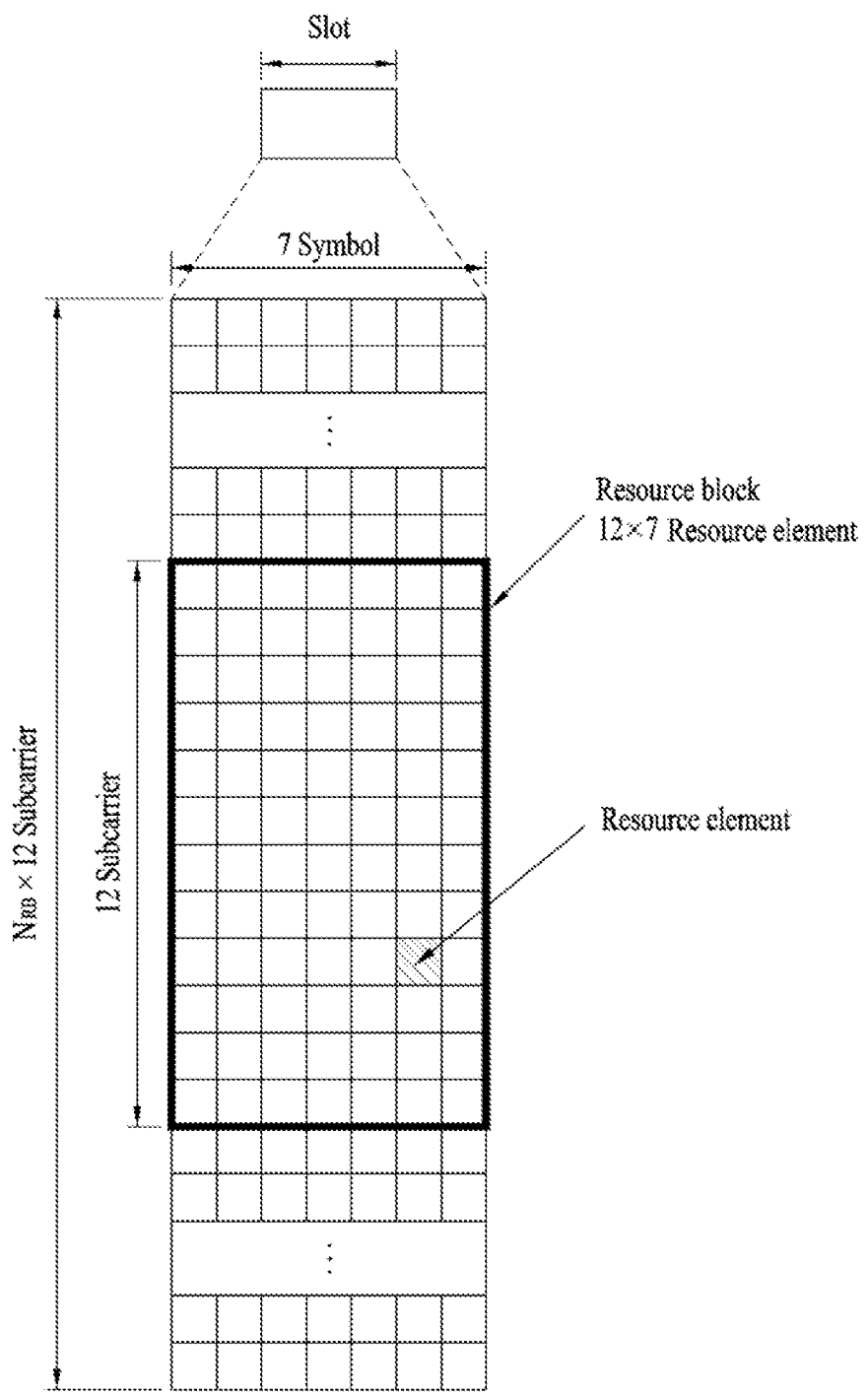
FIG. 3 illustrates a resource grid of a downlink slot.

FIG. 3 illustrates a resource grid in a slot. The slot includes a plurality of (e.g. 7 or 6) symbols (e.g. OFDM symbols or SC-FDMA symbols) in the time domain. The slot includes a plurality of source blocks (RBs) in the frequency domain. An RB includes 12 subcarriers. Each element in the resource grid is referred to as a resource element (RE). The RE is a minimum resource unit for signal transmission, and one modulation symbol is mapped to the RE.

Figure 4:
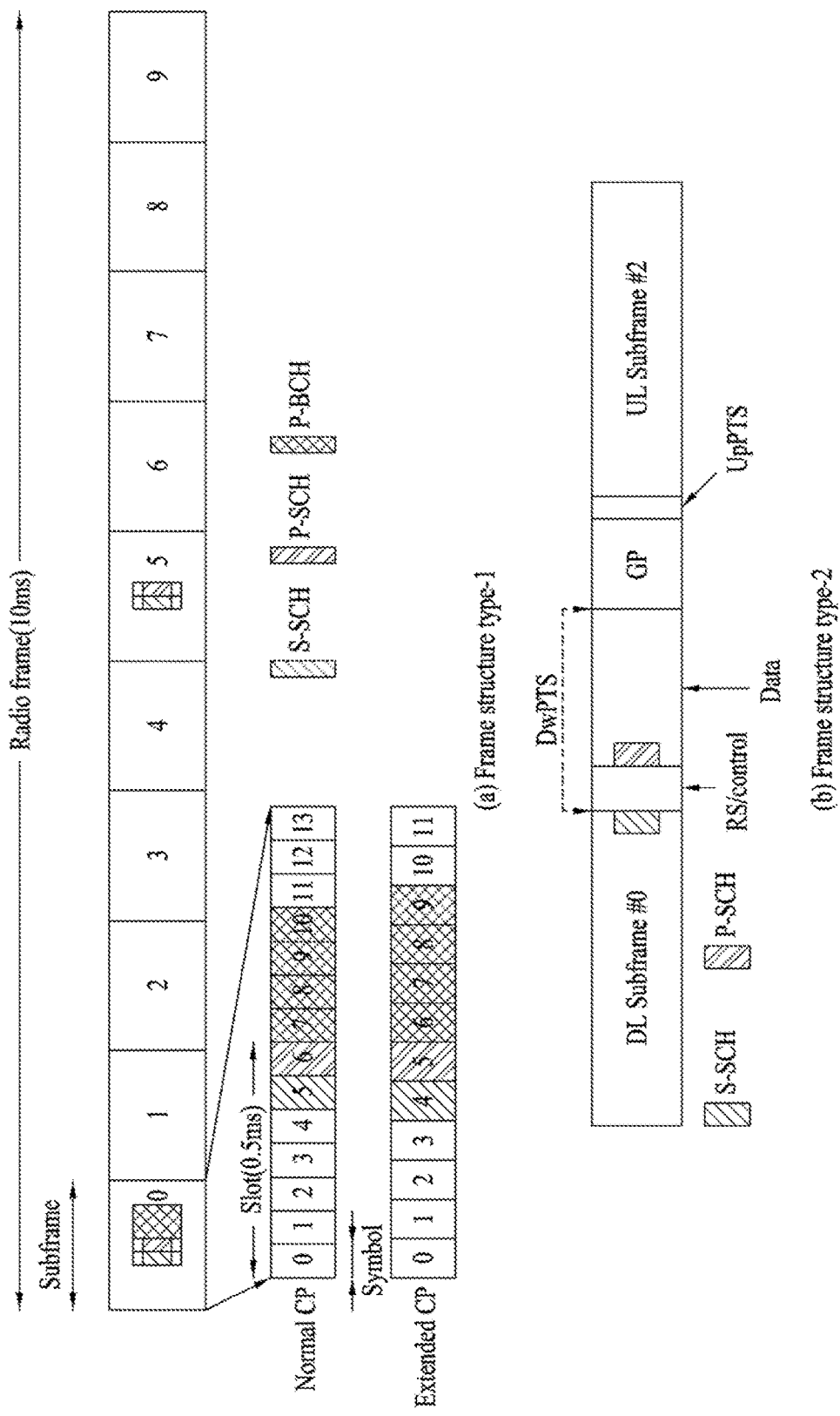
FIGS. 4 to 6 illustrate a physical broadcast channel (PBCH) and a synchronization channel (SCH) of an LTE system.
Figure 5:
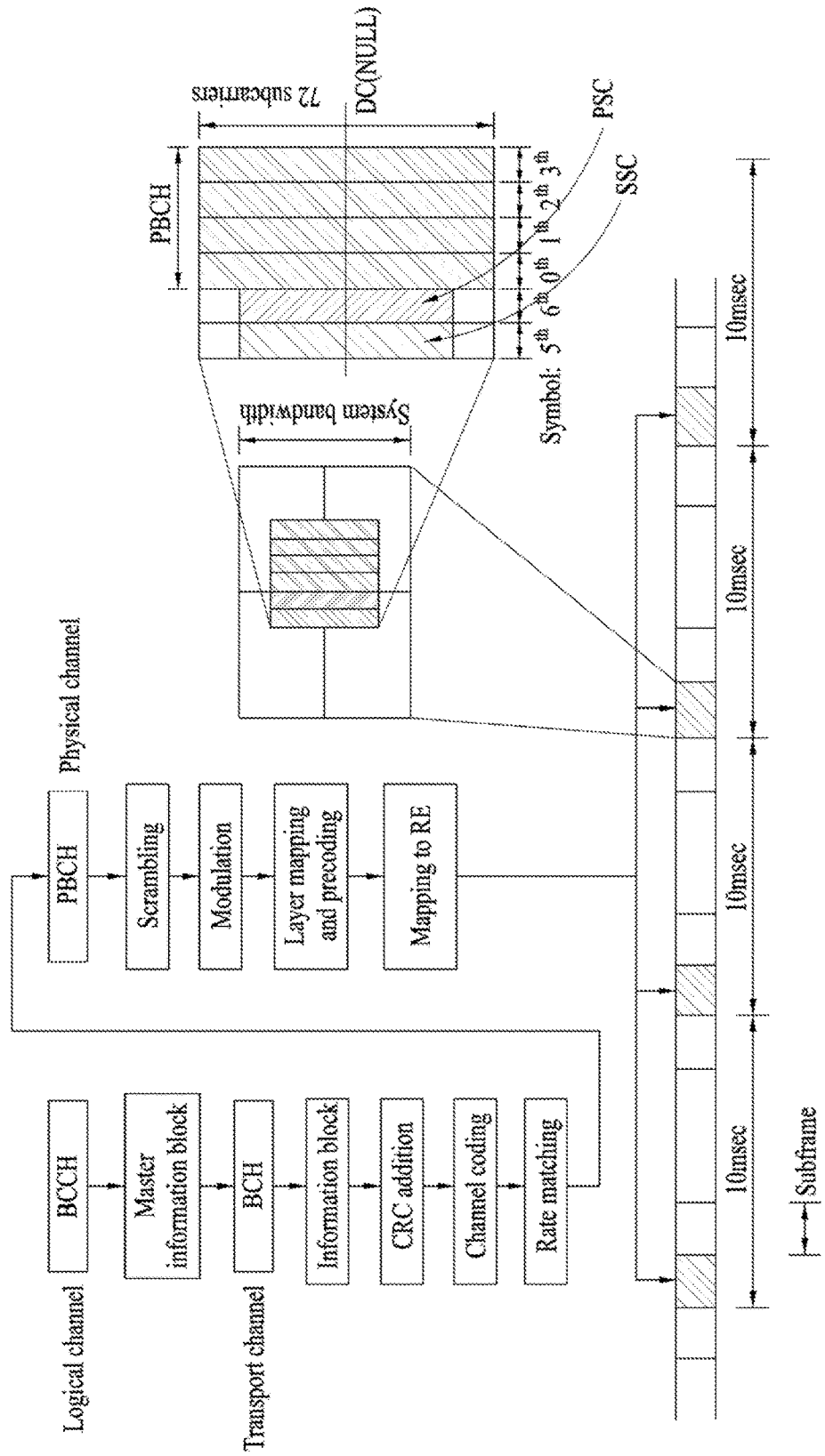
Figure 6:
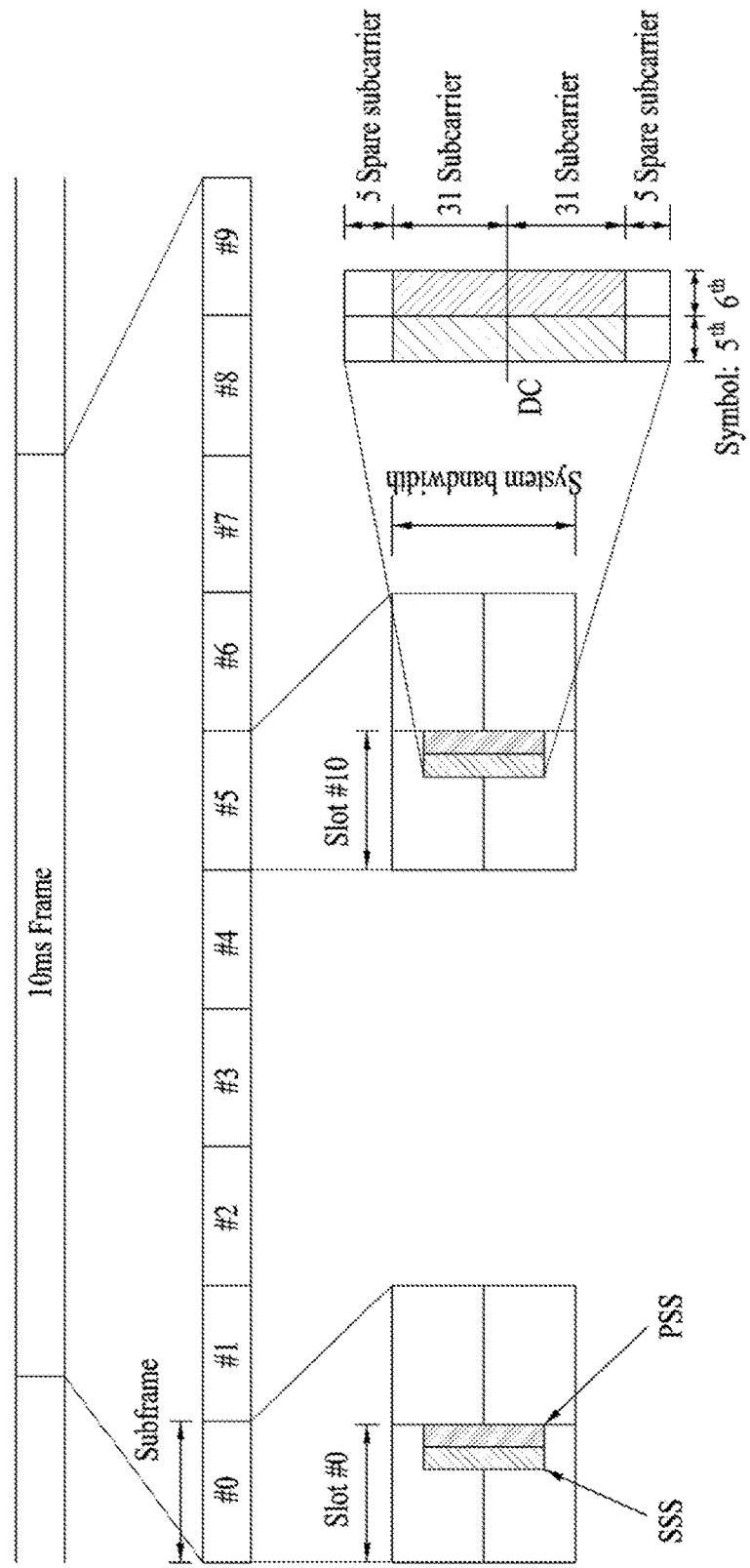

FIGS. 4 to 6 illustrate a physical broadcast channel (PBCH) and a synchronization channel (SCH) of an LTE system.

A PBCH is used to carry an MIB. The MIB includes minimum essential system information. Other system information is included in a system information block (SIB) which is transmitted over a PDSCH. Table 2 shows the contents of the MIB.

TABLE 2

-- ASN1START
MasterInformationBlock ::= SEQUENCE {
    dl-Bandwidth        ENUMERATED {n6,n15,n25,n50,n75,n100,
                              spare2,spare1},
    phich-Configuration      PHICH-Configuration,
    systemFrameNumber     BIT STRING (SIZE (8)),
    spare                  BIT STRING (SIZE (10))
}
-- ASN1STOP As shown in Table 2, the MIB includes a downlink bandwidth (DL BW), PHICH configuration information, a system frame number (SFN), 10 spare bits. Here, the SFN is an absolute value indicating a radio frame number and has a value in the range of 0 to 1023.

The MIB is scheduled at an interval of 40 ms and repeatedly transmitted four times in 40 ms. The i-th MIB transmission is scheduled in subframe #0 of a radio frame which satisfies SFN mod 4=i (i=0, 1, 2, 3). That is, a new MIB is transmitted in the first subframe (e.g. subframe #0) of a radio frame which satisfies SFN mod 4=0 every 40 ms and the same MIB is repeatedly transmitted three times at an interval of 10 ms. In this case, while actual SFNs corresponding to frames in which the MIB is transmitted in 40 ms are 4n, 4n+1, 4n+2 and 4n+3, the value of the SFN filed in the MIB is not changed. The SFN field in the MIB indicates 8 most significant bits (MSBs) of the actual SFN value and 2 least significant bits (LSBs) of the actual SFN value are determined within 40 ms according to MIB order. That is, first to fourth MIBs respectively indicate LSB=00, 01, 10, 11 in 40 ms. 40 ms timing is blind detected and explicit signaling for the 40 ms timing is not present.

The MIB is mapped to a physical resource after passing through channel coding, rate matching, cell-specific scrambling, modulation, layer mapping and precoding. In LTE (_A), the MIB is modulated according to QPSK (Quadrature Phase Shift Keying). A PBCH is mapped to a resource element (k, l) indicated by Equation 1 in the first subframe of a radio frame.

$$k = \frac{N_{RB}^{DL} N_{sc}^{RB}}{2} - 36 + k', \quad k' = 0, 1, \ldots, 71$$
$$l = 0, 1, \ldots, 3$$
[Equation 1]

In Equation 1, l indicates an OFDM symbol index in the second slot (e.g. slot #1) in a subframe and k indicates a subcarrier index. Here, REs reserved for CRSs are excluded in a PBCH mapping process, and an eNB performs the PBCH mapping process on the assumption that all CRSs for antenna ports 0 to 3 are present, irrespective of the actual antenna configuration thereof. In this case, a UE can perform a PDSCH reception process on the assumption that REs, which are not used for CRS transmission while being assumed to be reserved for CRSs in the PBCH mapping process, are not available for PDSCH transmission.

An SCH includes a P-SCH (Primary SCH) and an S-SCH (Secondary SCH). In frame structure type-1 (i.e., FDD), the P-SCH is located in the last OFDM symbols of slot #0 (i.e. the first slot of subframe #0) and slot #10 (i.e. the first slot of subframe #5) in each radio frame. The S-SCH is located in OFDM symbols immediately before the last OFDM symbols of slot #0 and slot #10. The S-SCH and P-SCH are disposed in neighboring OFDM symbols. In frame structure type-2 (i.e., TDD), the P-SCH is transmitted through the third OFDM symbols of subframe #1/#6 and the S-SCH is disposed in the last OFDM symbols of slot #1 (i.e., the second slot of subframe#0) and slot #11 (i.e., the second slot of subframe #5). The P-SCH/S-SCH is transmitted using 6 RBs on the basis of the center frequency in the OFDM symbols. 62 subcarriers from among 72 subframes constituting 6 RBs are used for P-SCH/S-SCH transmission and the remaining 10 subcarriers are left as spare subcarriers.

Figure 7:
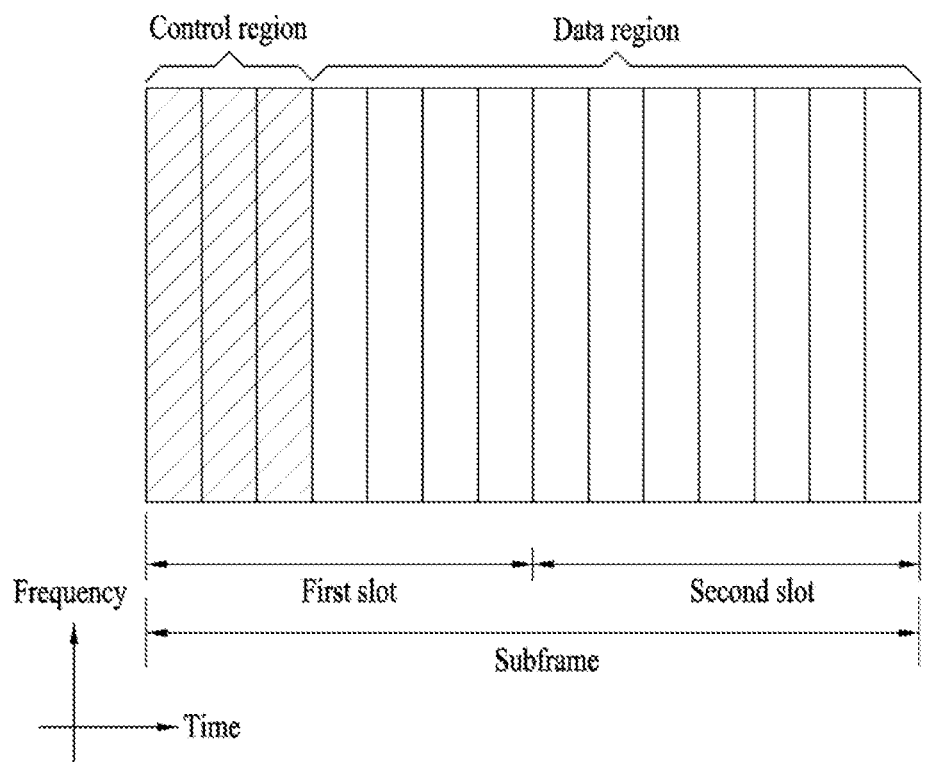
FIG. 7 illustrates a downlink subframe (SF) structure.

FIG. 7 illustrates a downlink subframe structure. A maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels include a physical control format indicator channel (PCFICH), a physical downlink control channel (PDCCH), a physical hybrid ARQ indicator channel (PHICH), etc.

A PCFICH is transmitted at a first OFDM symbol of a subframe and carries information (i.e., Control Format Indicator, CFI) regarding the number of OFDM symbols used for transmission of control channels within the subframe. The PCFICH is composed of 4 REGs which are equally distributed in the control region on the basis of cell ID. The PCFICH indicates values of 1 to 3 (or 2 to 4) and is modulated according to QPSK (Quadrature Phase Shift Keying). The PHICH is a response of uplink transmission and carries an HARQ acknowledgment (ACK)/negative-acknowledgment (NACK) signal. The PHICH is allocated to REGs except CRS and PCFICH (first OFDM symbol) in one or more OFDM symbols set based on PHICH duration. The PHICH is allocated to 3 REGs distributed in the frequency domain.

The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs.

The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. Control information transmitted through a PDCCH is referred to as DCI (Downlink Control Information). Formats 0, and 4 for uplink (hereinafter, UL grant) and formats 1, 1A, 1B, 1C, 1D, 2, 2A, 2B and 2C for downlink are (hereinafter, DL grant) defined as DCI formats. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary.

Figure 8:
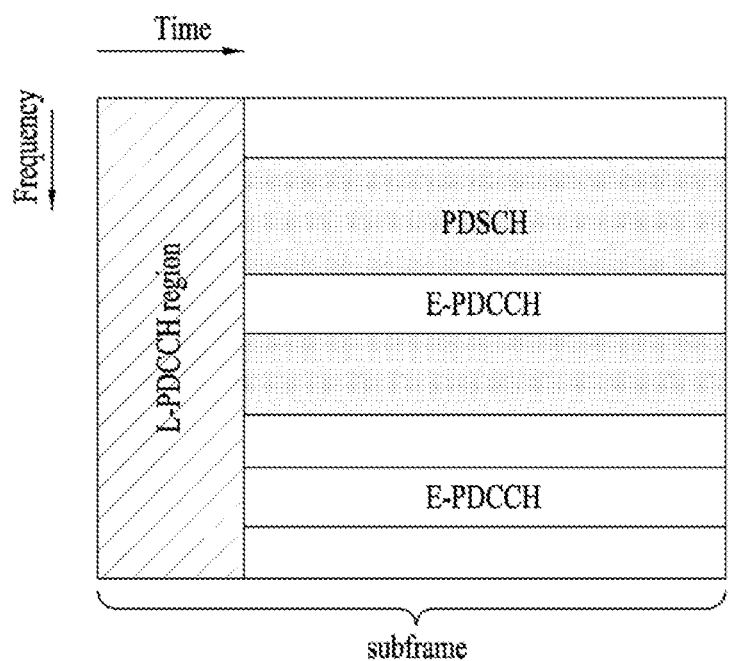
FIG. 8 illustrates an example of allocating an Enhanced PDCCH (E-PDCCH)

FIG. 8 illustrates an example of allocating an E-PDCCH to a subframe. In LTE, a PDCCH is transmitted through limited OFDM symbols. Accordingly, LTE-A introduced an enhanced PDCCH (E-PDCCH) for more flexible scheduling.

Figure 10:
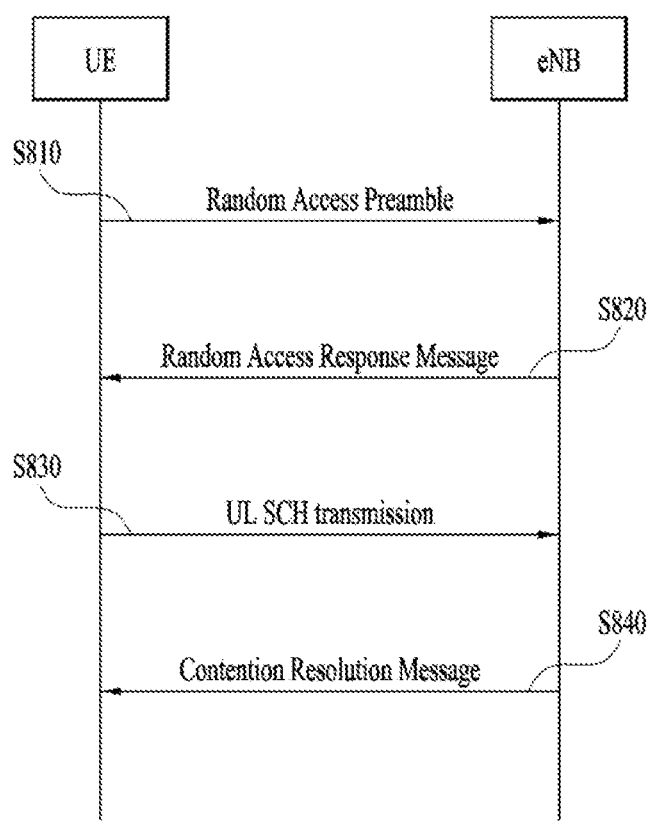
FIG. 10 illustrates a random access procedure.

Referring to FIG. 8, a PDCCH (legacy PDCCH, L-PDCCH) according to LTE(-A) can be allocated to a control region (refer to FIG. 7). An L-PDCCH region represents a region to which the legacy PDCCH can be assigned. The L-PDCCH region may refer to a control region, a control channel resource region (i.e. CCE resource) to which a PDCCH can be actually allocated in the control region or a PDCCH search space. A PDCCH can be additionally allocated to a data region (refer to FIG. 7). The PDCCH allocated to the data region is referred to as an E-PDCCH. As shown in FIG. 10, it is possible to mitigate scheduling restriction due to limited control channel resources of the L-PDCCH region by additionally securing control channel resources through the E-PDCCH. In the data region, an E-PDCCH and a PDSCH are multiplexed according to FDM (Frequency Division Multiplexing).

Specifically, the E-PDCCH can be detected/demodulated based on a DM-RS. The E-PDCCH may be transmitted over PRB pairs in the time domain. When E-PDCCH based scheduling is set, a subframe in which E-PDCCH transmission/detection is performed may be designated. The E-PDCCH can be configured in a USS only. A UE may attempt DCI detection only for L-PDCCH CSS and E-PDCCH USS in a subframe (referred to as an E-PDCCH subframe) in which E-PDCCH transmission/detection is set and attempt DCI detection for L-PDCCH CSS and L-PDCCH USS in a subframe (non-E-PDCCH subframe) in which E-PDCCH transmission/detection is not set.

Like the L-PDCCH, the E-PDCCH carries DCI. For example, the E-PDCCH can carry downlink scheduling information and uplink scheduling information. An E-PDCCH/PDSCH transmission/reception process and an E-PDCCH/PUSCH transmission/reception process are identical/similar to steps S107 and S108 of FIG. 4. That is, the UE can receive an E-PDCCH and receive data/control information through a PDSCH corresponding to the E-PDCCH. In addition, the UE can receive an E-PDCCH and transmit data/control information through a PUSCH corresponding to the E-PDCCH. LTE adopts a method of reserving a PDCCH candidate region (referred to as a PDCCH search space hereinafter) within a control region and transmitting a PDCCH of a specific UE in a part of the reserved PDCCH candidate region. Accordingly, the UE can acquire the PDCCH thereof within the PDCCH search space through blind detection. Similarly, an E-PDCCH can be transmitted through a whole reserved resource or part of the reserved resource.

Figure 9:
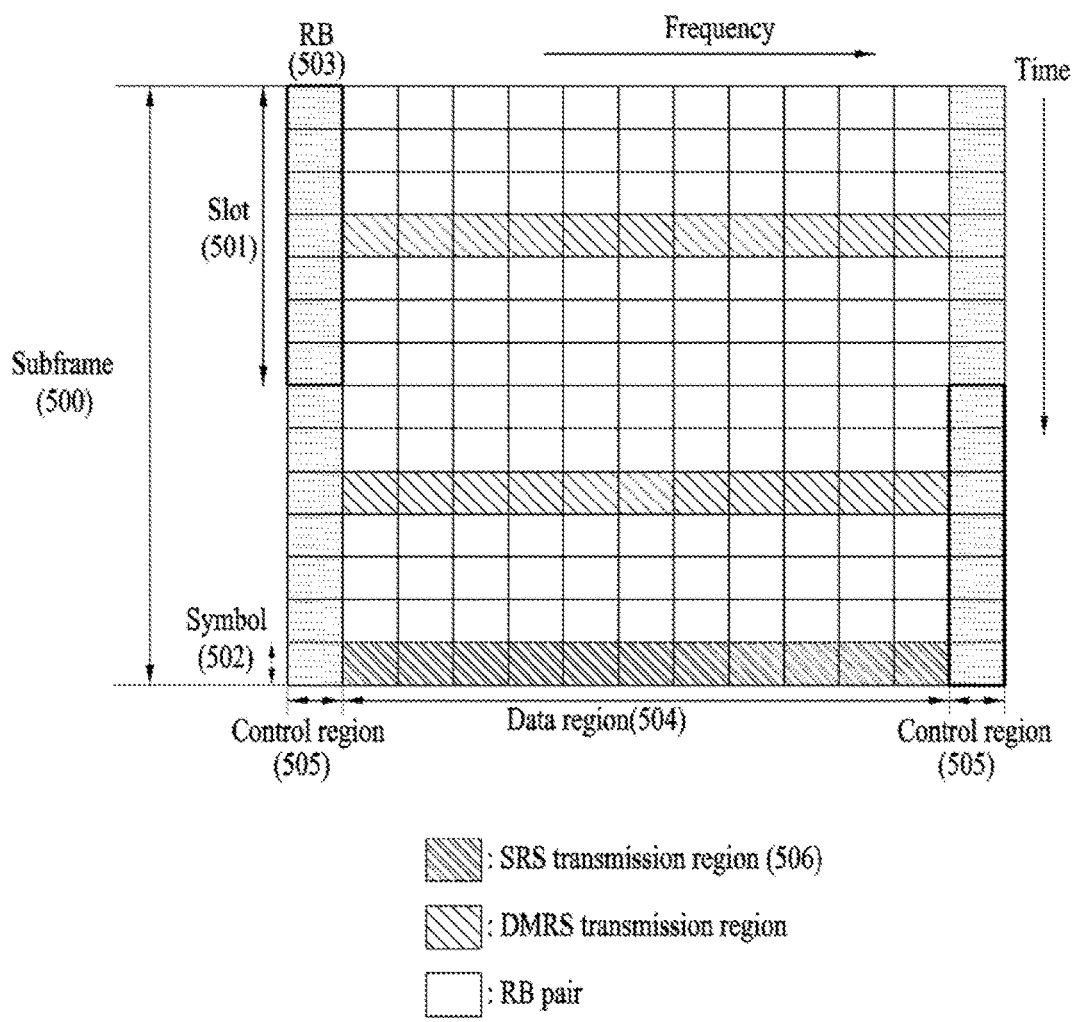
FIG. 9 illustrates an uplink subframe structure.

FIG. 9 illustrates an uplink subframe structure. A subframe 500 is composed of two 0.5 ms slots 501 each of which includes a plurality of SC-FDMA symbols. The subframe structure is divided into a data region 504 and a control region 505. The data region refers to communication resources used to transmit data such as audio data, packets and the like to each UE and includes a PUSCH (Physical Uplink Shared Channel). The control region refers to communication resources used to transmit uplink control signals, for example, a downlink channel quality report, reception ACK/NACK for a downlink signal, an uplink scheduling request and the like from each UE, and includes a PUCCH (Physical Uplink Control Channel). A sounding reference signal (SRS) is transmitted through the last SC-FDMA symbol of one subframe in the time domain. SRSs of multiple UEs, which are transmitted through the last SC-FDMA symbol of the same subframe, can be discriminated according to frequency position/sequence. An SRS may be periodically transmitted or aperiodically transmitted at the request of an eNB.

A configuration for periodic transmission of an SRS is configured by a cell-specific SRS parameter and a UE-specific SRS parameter. The cell-specific SRS parameter (a cell-specific SRS configuration) and the UE-specific SRS parameter (a UE-specific SRS configuration) are transmitted to a UE through higher layer (e.g., RRC) signaling.

The cell-specific SRS parameter includes srs-BandwidthConfig and srs-SubframeConfig. srs-BandwidthConfig indicates information about a frequency bandwidth in which an SRS may be transmitted and srs-SubframeConfig indicates information about a subframe in which an SRS may be transmitted. A subframe in which an SRS may be transmitted within a cell is periodically set in a frame. Table 1 shows srs-SubframeConfig in the cell-specific SRS parameter.

TABLE 3

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | Reserved |

TSFC denotes a cell-specific subframe configuration and ΔSFC denotes a cell-specific subframe offset. srs-Subframe- Config is provided by a higher layer (e.g., RRC layer). An SRS is transmitted through a subframe satisfying floor($n_s$/2)mod $T_{SFC} \in \Delta_{SFC}$. Ns denotes a slot index. floor( ) is a flooring function and mod denotes a modulo operation.

The UE-specific SRS parameter includes srs-Bandwidth, srs-HoppingBandwidth, freqDomainPosition, srs-ConfigIndex, transmissionComb and cyclicShift. srs-Bandwidth indicates a value used to set a frequency bandwidth in which a UE should transmit an SRS. srs-HoppingBandwidth indicates a value used to set frequency hopping of an SRS. freqDomainPosition indicates a value used to determine a frequency position where an SRS is transmitted. srs-ConfigIndex indicates a value used to set a subframe in which a UE should transmit an SRS. transmissionComb indicates a value used to set an SRS transmission Comb. cyclicShift indicates a valued used to set a cyclic shift value applied to an SRS sequence.

Tables 4 and 5 show an SRS periodicity and a subframe offset according to srs-ConfigIndex. The SRS transmission periodicity indicates a time interval (unit: subframe or ms) in which a UE should periodically transmit an SRS. Table 4 shows an FDD case and Table 5 shows a TDD case. The SRS configuration index $I_{SRS}$ is signaled on a per UE basis and each UE confirms the SRS transmission periodicity $T_{SRS}$ and the SRS subframe offset $T_{offset}$ using the SRS configuration index $I_{SRS}$.

TABLE 4

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 5

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

In summary, in the existing 3GPP Rel-9 (LTE), the cell-specific SRS parameter indicates subframes occupied for SRS transmission within a cell to a UE and the UE-specific SRS parameter indicates subframes, which will actually be used by the UE, among the subframes occupied for SRS transmission. The UE periodically transmits an SRS through a specific symbol (e.g., a last symbol) of the subframe specified as the UE-specific SRS parameter. More specifically, the SRS is periodically transmitted in a subframe satisfying Equation 2.

FDD case, TDD with $T_{SRS}>2$ case $$(10 \cdot n_f + k_{SRS} - T_{offset}) \bmod T_{SRS} = 0$$

TDD with $T_{SRS}=2$ case $$(k_{SRS} - T_{offset}) \bmod 5 = 0 \quad \text{[Equation 2]}$$

Here, $n_f$ denotes a frame index, $T_{SRS}$ denotes an SRS transmission periodicity and $T_{offset}$ denotes a (subframe) offset for SRS transmission. $k_{SRS}$ denotes a subframe index in the frame $n_f$. In the case of FDD, $k_{SRS}=\{0, 1, \ldots, \text{and } 9\}$. In the case of TDD, $k_{SRS}$ is shown in Table 6.

TABLE 6

| | Subframe index n | | | | | | | | | | |
|---|---|---|---|---|---|---|---|---|---|---|---|
| | | 1 | | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

In order to protect SRS transmission in the subframe occupied through the cell-specific SRS parameter, a UE may not transmit an uplink signal through a last symbol of a subframe regardless of whether or not an SRS is actually transmitted in the subframe. Specifically, when a PUCCH/PUSCH is allocated to a cell-specific SRS subframe and a PUCCH/PUSCH transmission band and a cell-specific SRS band overlap, the UE does not transmit the PUCCH/PUSCH in the last symbol of the cell-specific SRS subframe in order to protect an SRS of another UE.

FIG. 10 illustrates a random access procedure. The random access procedure is used to transmit short-length data in uplink. For example, the random access procedure is performed upon initial access in an RRC idle mode, upon initial access after radio link failure, upon handover requiring the random access procedure, and upon the occurrence of uplink/downlink data requiring the random access procedure during an RRC connected mode. The random access procedure is divided into a contention-based procedure and a non-contention-based procedure.

Referring to FIG. 10, a UE receives information about random access from an eNB through system information and stores the received information. The UE transmits a random access preamble (message 1 (Msg1)) to the eNB through a PRACH when random access is needed (S810). Upon reception of the random access preamble from the UE, the eNB transmits a random access response message (message 2 (Msg2)) to the UE (S820). Specifically, downlink scheduling information about the random access response message is CRC-masked with a random access-RNTI (RA-RNTI) and transmitted through a PDCCH. Upon reception of the downlink scheduling signal masked with the RA-RNTI, the UE can receive the random access response message from a PDSCH. Then, the UE checks whether the random access response message includes a random access response (RAR) destined for the UE. The RAR includes timing advance (TA), uplink resource allocation information (UL grant), UE temporary identifier and the like. The UE transmits a UL-SCH (Shared Channel) message (message 3 (Msg3)) to the eNB according to the UL grant (S830). The eNB receives the UL-SCH message and then transmits a contention resolution message (message 4 (Msg4)) to the UE (S840).

Figure 11:
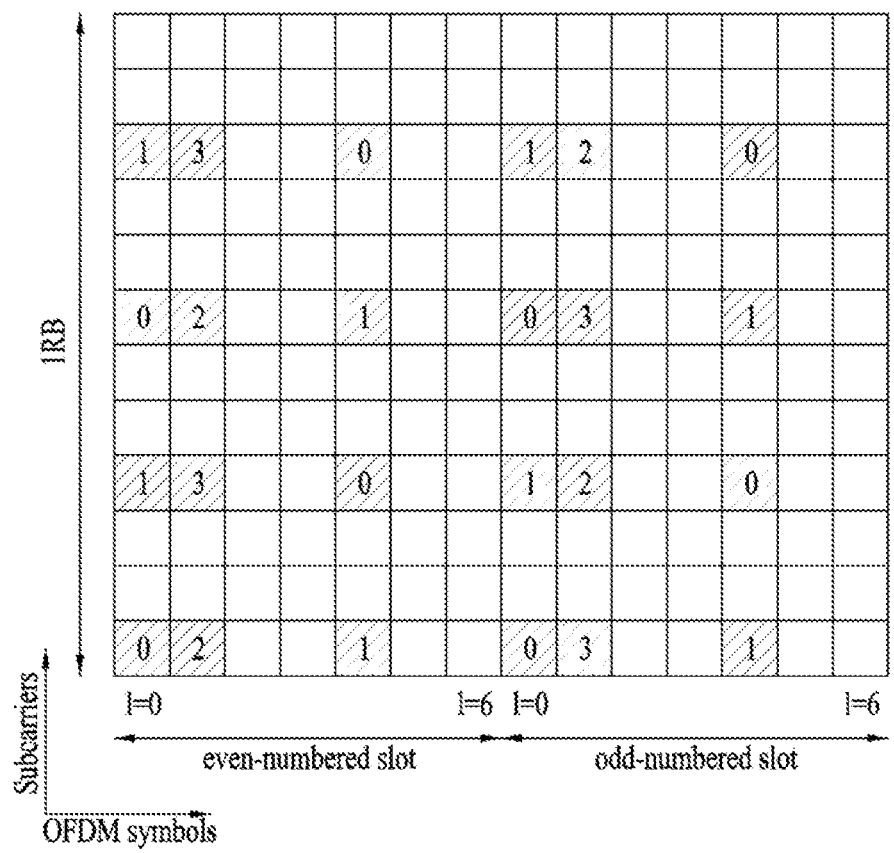
FIG. 11 illustrates a cell-specific reference signal (CRS)

FIG. 11 illustrates a cell-specific reference signal (CRS). CRSs are transmitted through antenna ports 0 to 3. One antenna (P=0), two antennas (P=0 and 1) or four antennas (P=0, 1, 2 and 3) can be supported according to eNB. FIG. 6 illustrates a CRS structure when up to four antennas are supported. Since the CRS is used for both demodulation and measurement in LTE, the CRS is transmitted over the entire bands in all downlink subframes supporting PDSCH transmission and transmitted through all antenna ports configured for an eNB. The CRS has high RS overhead since the CRS is transmitted over the entire band of each subframe.

To solve this problem, LTE-A additionally defines a UE-specific RS (UE-RS) and a CSI-RS. The UE-RS is used for demodulation and the CSI-RS is used to obtain channel state information. The UE-RS can be regarded as a demodulation reference signal (DRS). The UE-RS is transmitted only in RBs to which a PDSCH is mapped in a subframe in which the PDSCH is scheduled. The CSI-RS is a downlink RS introduced for channel measurement. LTE-A defines a plurality of CSI-RS configurations for CSI-RS transmission.

The CSI-RS is transmitted at a predetermined transmission interval. A CSI-RS transmission subframe (referred to as a CSI-RS subframe hereinafter) is determined by a CSI-RS transmission periodicity $T_{CSI-RS}$ and a CSI-RS subframe offset $\Delta_{CSI-RS}$. The CSI-RS transmission periodicity $T_{CSI-RS}$ and the CSI-RS subframe offset $\Delta_{CSI-RS}$ are given according to CSI-RS subframe configuration information $I_{CSI-RS}$, as shown in the following table.

TABLE 7

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

A CSI-RS subframe is set as a subframe which satisfies the following equation.

$$(10n_f+\lfloor n_s/2 \rfloor - \Delta_{CSI-RS}) \bmod T_{CSI-RS} = 0 \quad [\text{Equation 3}]$$

where $n_f$ indicates an SFN value of a radio frame and $n_s$ indicates a slot index.

In CSI-RS subframes, a CSI-RS sequence $r_{l,n_s}(m)$ is mapped to a complex modulation symbol $a_{k,l}^{(p)}$ used as a reference symbol for antenna port p according to the following equation.

$$a_{k,l}^{(p)} = w_{l''} \cdot r_{l,n_s}(m') \quad [\text{Equation 4}]$$

Here, $w_{l''}$, k and l are provided according to the following equation.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases} \quad [\text{Equation 5}]$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Here, (k', l') are given according to Tables 8 and 9. Table 8 shows a normal CP case and Table 9 shows an extended CP case. Tables 8 and 9 show positions of slots and REs occupied by CSI-RSs of antenna ports in an RB pair according to CSI-RS configuration and the number of configured CSI-RSs (i.e., the number of configured CSI-RS ports).

TABLE 8

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

*FS1: Frame structure type 1 (FDD). FS2: Frame structure type 2 (TDD).

TABLE 9

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 12:
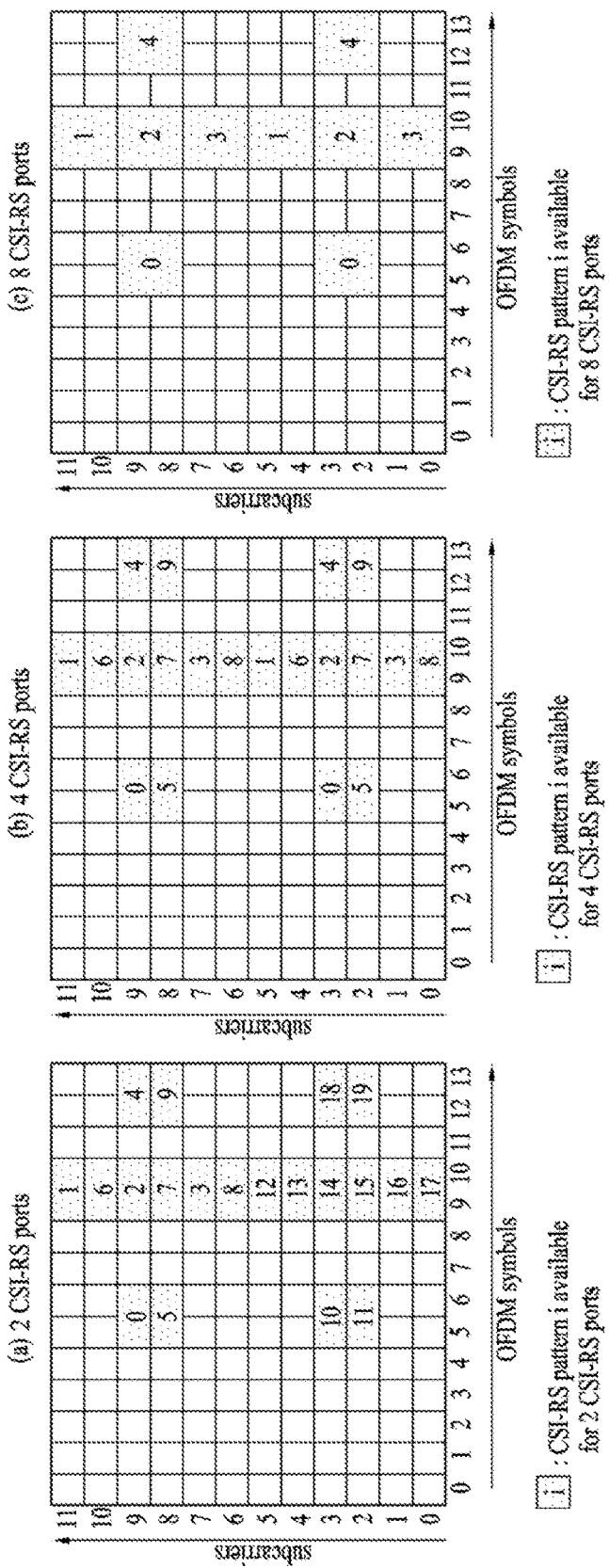
FIG. 12 illustrates channel state information reference signal (CSI-RS) configurations.

FIG. 12 illustrates channel state information reference signal (CSI-RS) configurations. FIG. 12(a) shows 20 CSI-RS configurations 0 to 19 available for CSI-RS transmission using two CSI-RS ports, from among the CSI-RS configurations of Table 4, FIG. 12(b) shows 10 CSI-RS configurations 0 to 9 available for CSI-RS transmission using four CSI-RS ports, from among the CSI-RS configurations of Table 4, and FIG. 12(c) shows 5 CSI-RS configurations 0 to 4 available for CSI-RS transmission using eight CSI-RS ports, from among the CSI-RS configurations of Table 4. CSI-RS ports refer to antenna ports configured for CSI-RS transmission. For example, antenna ports 15 to 22 correspond to CSI-RS ports in Equation 4.

Figure 13:
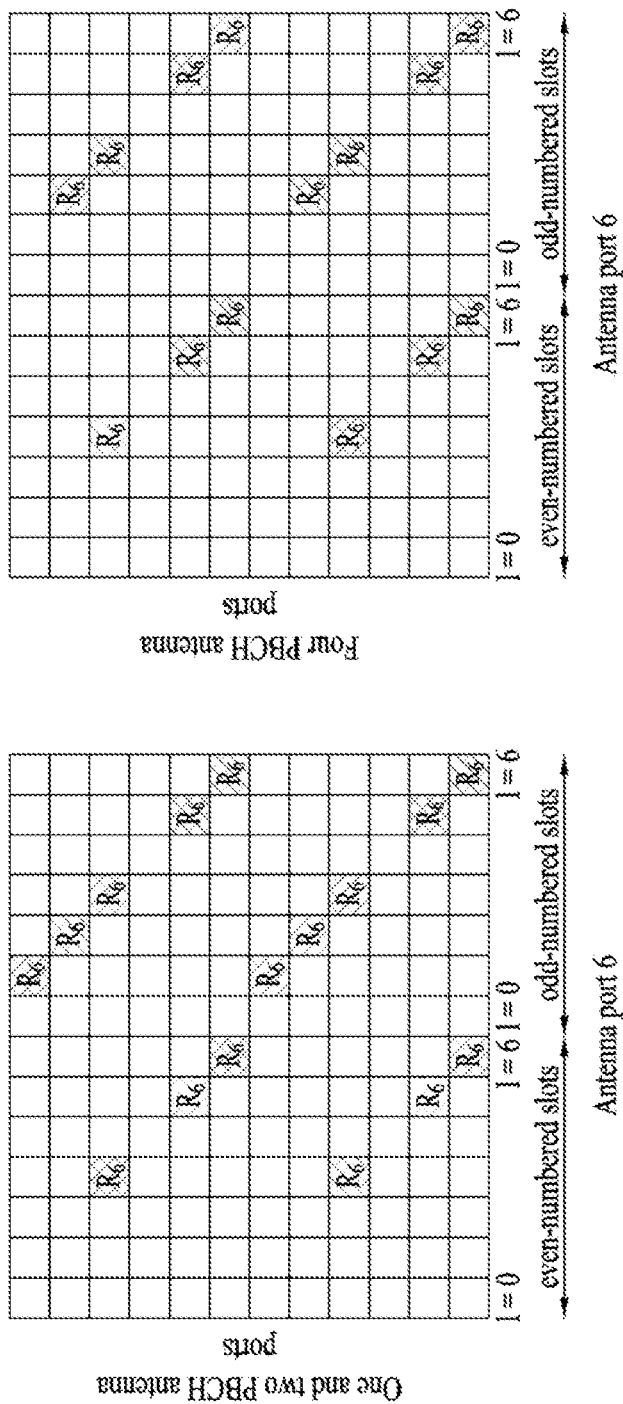
FIG. 13 illustrates channel state information reference signal (CSI-RS) configurations.

FIG. 13 illustrates a positioning reference signal (PRS). The PRS is a reference signal used to measure a UE position and is transmitted through antenna port 6. The PRS is transmitted in consecutive RBs in a downlink subframe in which PRS transmission is set, and a PRS transmission band is set by a higher layer (e.g., RRC). A PRS transmission subframe (referred to as a PRS subframe hereinafter) is periodically set by a higher layer (e.g., RRC). The PRS subframe is defined by a PRS configuration index $I_{PRS}$ as follows.

TABLE 10

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | | Reserved |

A PRS subframe is set as a subframe which satisfies the following equation.

$$(10n_f + \lfloor n_s/2 \rfloor - \Delta_{PRS}) \bmod T_{PRS} = 0 \quad \text{[Equation 6]}$$

wherein $n_f$ indicates an SFN value of a radio frame and $n_s$ indicates a slot index.

In PRS subframes, a PRS sequence $r_{l,n_s}(m)$ is mapped to a complex modulation symbol $a_{k,l}^{(p)}$ used as a reference symbol for antenna port p=6 according to the following equation.

$$a_{k,l}^{(p)} = r_{l,n_s}(m') \quad \text{[Equation 7]}$$

Here, k, l and m' are given according to the following equation.
[Equation 9]
Normal cyclic prefix:

$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 PBCH antenna ports)} \\ 2, 3, 5, 6 & \text{if } n_s \bmod 2 = 1 \text{ and (4 PBCH antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

Extended cyclic prefix:

$$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and (1 or 2 PBCH antenna ports)} \\ 2, 4, 5 & \text{if } n_s \bmod 2 = 1 \text{ and (4 PBCH antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

Here, a PRS transmission band $N_{RB}^{PRS}$ is set by a higher layer, and $v_{shift} = N_{ID}^{cell} \bmod 6$. $N_{ID}^{cell}$ indicates a physical cell ID (i.e., eNB ID).

Embodiment: MTC (Machine Type Communication) Coverage Enhancement

Terms and abbreviations used in the present invention are described.

SF: subframe.

EPDCCH/PDSCH (bundle) period: this refers to a period in which an EPDCCH/PDSCH having the same information is repeatedly transmitted for coverage enhancement or an SF set (or resources) constituting the period. The EPDCCH/PDSCH (bundle) period may refer to an SF set (or resources) in which the EPDCCH/PDSCH is actually transmitted.

EPDCCH/PDSCH bundle: this refers to an EPDCCH/PDSCH set repeatedly transmitted in the EPDCCH/PDSCH (bundle) period. The EPDCCH/PDSCH bundle carries the same information.

PUSCH/PUCCH/PRACH (bundle) period: this refers to a period in which a PUSCH/PUCCH/PRACH having the same information is repeatedly transmitted for coverage enhancement or an SF set (or resources) constituting the period. The PUSCH/PUCCH/PRACH (bundle) period may refer to an SF set (or resources) in which the PUSCH/PUCCH/PRACH is actually transmitted.

PUSCH/PUCCH/PRACH bundle: this refers to a PUSCH/PUCCH/PRACH set repeatedly transmitted in the PUSCH/PUCCH/PRACH (bundle) period. The PUSCH/PUCCH/PRACH bundle carries the same information.

CSI-RS (transmission) SF: this refers to an SF in which a CSI-RS is transmitted or can be transmitted.

CSI-RS RE: this refers to an RE through which a CSI-RS is transmitted or can be transmitted.

SRS (transmission) SF: this refers to an SF in which an SRS is transmitted or can be transmitted. SRS SFs can be classified into a cell-specific SRS SF and a UE-specific SRS SF. The UE-specific SRS SF is a subset of the cell-specific SRS SF.

Rate-matching/puncturing: this is used to match the quantity of transmitted information to the quantity of physical resources. Specifically, rate-matching refers to a method of adjusting the number of coded symbols to the quantity of physical resources after channel coding and puncturing refers to a method of abandoning transmission of part of coded symbols (or modulated symbols) according to the quantity of physical resources.

Systems following LTE-A consider configuration of inexpensive/low-specification UEs which mainly perform data communication such as metering, water level measurement, utilization of monitoring cameras, vending machine inventory reporting and the like. Such UEs are called MTC (Machine Type Communication) UEs for convenience. Since MTC UEs have a small quantity of transmitted data and infrequently perform uplink/downlink data transmission/reception, it is efficient to reduce the UE price and battery power consumption according to low data transfer rate. In addition, such MTC UEs have characteristics that mobility is low and channel environments are hardly changed. Various coverage enhancement schemes per channel/signal are under discussion in consideration of situations in which MTC UEs are installed in coverage-limited places such as buildings, factories and basements. For example, coverage enhancement operations include operation of enhancing coverage for DL/UL channel/signal transmission, for example, repeated PRACH preamble transmission (or transmission of a PRACH preamble having a long duration), repeated PDCCH transmission, repeated PDSCH/PUSCH transmission, repeated PUCCH transmission and the like.

To reduce/omit a procedure in which an MTC UE attempts meaningless initial access (and latency/power consumption due to the meaningless initial access) in a cell which does not support coverage enhancement operation, whether the corresponding cell supports coverage enhancement is signaled to the MTC UE. Whether coverage enhancement is supported may be signaled through a broadcast signal (e.g., a PBCH (e.g., using spare bits), SIB (e.g., SIB1 or SIB2)).

The MTC UE may be configured to perform operation (i.e. DRX operation having a very long period) in which the MTC UE is in a sleep state for a long time, temporarily wakes up to perform necessary data transmission/reception operation and then is switched to a sleep state, according to delay-tolerant traffic characteristics thereof. In this situation, a CSI-RS configuration may be changed/added/cancelled for a sleep interval of the MTC UE. In this case, when the MTC UE wakes up, an eNB may need to individually inform the MTC UE of changed CSI-RS configuration information (through RRC signaling or the like). Here, CSI-RS configuration information refers to the information described above with reference to FIG. 12 and can include information indicating a CSI-RS SF, a CSI-RS RE and the like, for example. However, individual signaling of CSI-RS configuration information to each MTC UE may cause remarkable system overhead. Particularly, if repeated EPDCCH and/or PDSCH transmission is set/applied for MTC UE coverage enhancement, system overhead due to CSI-RS configuration information signaling can be further increased. To solve this problem, solutions Sol 1 to Sol 4 can be considered.

[Sol 1]

CSI-RS configuration information may be UE-commonly signaled through a PBCH, an SIB or an additional broadcast signal/channel (transmitted with a predetermined period). An eNB may not map an EPDCCH/PDSCH signal to a CSI-RS SF/RE corresponding to the CSI-RS configuration information. To this end, the eNB can rate-match or puncture the EPDCCH/PDSCH signal in consideration of the CSI-RS SF/RE. Upon reception of the CSI-RS configuration information, an MTC UE can perform EPDCCH/PDSCH detection/reception operation on the assumption that an EPDCCH/PDSCH signal is not present in the CSI-RS SF/RE corresponding to the CSI-RS configuration information. For example, the MTC UE can exclude the CSI-RS SF/RE in an EPDCCH/PDSCH signal demodulation/decoding process.

[Sol 2]

Whether an EPDCCH/PDSCH signal is mapped/transmitted to/in a CSI-RS RE available in a cell may be UE-commonly or UE-specifically signaled. Accordingly, the eNB may or may not map/transmit the EPDCCH/PDSCH signal to/in the CSI-RS RE available in the cell during EPDCCH/PDSCH signal transmission. In the case of a PDSCH, signaling may be indicated through a DL grant (PDCCH or EPDCCH) that schedules the PDSCH. The MTC UE can perform EPDCCH/PDSCH detection/reception operation on the assumption that an EPDCCH/PDSCH signal is present or not in the CSI-RS SF/RE according to the signaling. For example, the MTC UE can include or exclude the CSI-RS SF/RE in an EPDCCH/PDSCH signal demodulation/decoding process according to the signaling.

[Sol 3]

An EPDCCH/PDSCH signal may not be mapped/transmitted to/in a CSI-RS RE available in a cell all the time irrespective of whether a CSI-RS is actually transmitted or not (i.e., irrespective of actual CSI-RS configuration). In this case, while the number of REs available for EPDCCH/PDSCH transmission is reduced, CSI-RS transmission resources and a degree of freedom of CSI-RS configuration can be secured and system overhead due to CSI-RS configuration information change can be prevented. Alternatively, to secure the number of REs available for EPDCCH/PDSCH transmission, the eNB can map/transmit the EPDCCH/PDSCH signal to/in all CSI-RS REs available in the cell irrespective of actual CSI-RS configuration. In this case, the MTC UE can operate on the assumption that CSI-RS transmission/configuration is not present in an EPDCCH/PDSCH bundle period. For example, the MTC UE can skip a CSI-RS based channel measurement process in the EPDCCH/PDSCH bundle period and normally perform the CSI-RS based channel measurement process according to the actual CSI-RS configuration in other periods.

[Sol 4]

It is assumed that the UE is aware of the CSI-RS configuration information through the aforementioned signaling or conventional signaling. In addition, it is assumed that repeated EPDCCH/PDSCH transmission is applied. In this case, to equally maintain an EPDCCH/PDSCH signal configuration in an EPDCCH/PDSCH bundle period (so as to facilitate reception combining operation), the eNB may not map/transmit the EPDCCH/PDSCH signal in the corresponding EPDCCH/PDSCH bundle period for an RE set corresponding to a union of all CSI-RS REs configured in SFs belonging to the corresponding EPDCCH/PDSCH bundle. Alternatively, when at least one CSI-RS SF is included in the SFs belonging to the EPDCCH/PDSCH bundle, the eNB may not map/transmit the EPDCCH/PDSCH signal to/in all CSI-RS REs available in the cell (irrespective of actual CSI-RS configuration in each EPDCCH/PDSCH SF) in the corresponding EPDCCH/PDSCH bundle period. That is, only when no CSI-RS configuration is included in the SFs belonging to the EPDCCH/PDSCH bundle, can the EPDCCH/PDSCH signal be mapped/transmitted in the corresponding EPDCCH/PDSCH bundle period without rate-matching or puncturing according to CSI-RS.

Sol 3 or Sol 4 may be applied to REs used for PBCH, PSS and SSS transmission. In the case of Sol 3, for example, in an EPDCCH/PDSCH transmission SF, an EPDCCH/PDSCH can be rate-matched or punctured in consideration of PBCH, PSS and SSS transmission REs available in the corresponding SF irrespective or presence or absence of actual PBCH, PSS and SSS transmission REs. In the case of Sol 4, the eNB may not map/transmit an EPDCCH/PDSCH signal in the corresponding EPDCCH/PDSCH bundle period for an RE set corresponding to a union of all PBCH/PSS/SSS REs defined in SFs belonging to one EPDCCH/PDSCH bundle. Alternatively, when at least one PBCH/PSS/SSS transmission SF is included in the SFs belonging to the EPDCCH/PDSCH bundle, the eNB may not map/transmit the EPDCCH/PDSCH signal to/in all available PBCH/PSS/SSS REs (irrespective of presence or absence of an actual PBCH/PSS/SSS RE in each EPDCCH/PDSCH SF) in the corresponding EPDCCH/PDSCH bundle period. That is, only when all SFs belonging to the EPDCCH/PDSCH bundle include do not include a PBCH/PSS/SSS RE, can the EPDCCH/PDSCH signal be mapped/transmitted in the EPDCCH/PDSCH bundle period without rate-matching or puncturing according to PBCH/PSS/SSS.

An EPDCCH/PDSCH bundle mapping/transmission pattern (e.g., RE to be rate-matched and/or EPDCCH/PDSCH SF) may be affected by MBSFN SF change/addition/cancellation, PRS (Positioning Reference Signal) transmission SF change/addition/cancellation and the like. Accordingly, at least one of MBSFN SF (or PMCH transmission SF) information, PRS transmission SF information and EPDCCH/PDSCH (and/or PUSCH/PUCCH/PRACH) bundle configuration information (e.g., information on SFs constituting the bundle) may be UE-commonly signaled through a PBCH, an SIB or an additional broadcast signal/channel (e.g., broadcast signal/channel transmitted with a predetermined period, similarly to Sol 1). In this case, the MTC UE may not receive an EPDCCH/PDSCH signal in an MBSFN SF and/or a PRS transmission SF. That is, the MBSFN SF and/or the PRS transmission SF can be excluded from the EPDCCH/PDSCH bundle. Accordingly, when the EPDCCH/PDSCH bundle period includes the MBSFN SF and/or the PRS transmission SF, the MTC UE can skip an EPDCCH/PDSCH detection/reception process in the MBSFN SF and/or the PRS transmission SF and perform EPDCCH/PDSCH detection/reception operation in other SFs. In addition, the MBSFN SF and/or the PRS transmission SF in the EPDCCH/PDSCH bundle period can be excluded from reception combining operation for PDCCH/PDSCH detection/reception. Alternatively, the EPDCCH/PDSCH signal may not be transmitted/received all the time in all SFs configurable for MBSFN transmission and/or PRS transmission irrespective of actual MBSFN/PRS configuration, similarly to Sol 3. That is, all SFs configurable for MBSFN transmission and/or PRS transmission can be excluded from the EPDCCH/PDSCH bundle.

Furthermore, to omit rate-matching operation, the EPDCCH/PDSCH signal may be configured not to be transmitted/received in a CSI-RS transmission SF, a PBCH transmission SF and/or a PSS/SSS transmission SF. That is, the CSI-RS transmission SF, PBCH transmission SF and/or PSS/SSS transmission SF can be excluded from the EPDCCH/PDSCH bundle. In addition, the EPDCCH/PDSCH signal may be configured not to be transmitted/received in all special SFs or specific special SFs (e.g. a special SF in which a DwPTS is composed of L or fewer symbols (e.g., L=3 (normal CP), L=6 (normal CP)) and/or a special SF in which a DMRS is not transmitted) in TDD. That is, the corresponding special SFs can be excluded from the EPDCCH/PDSCH transmission bundle.

A specific SF (e.g., an MBSFN SF, a PRS transmission SF, SF #1/#6 in TDD or the like), for which the range and maximum value of the CFI value are differently defined from the normal SF, may be present. In this situation, it is possible to consider a case in which repeated PDCCH transmission is performed on the basis of a predetermined CFI value or an additionally signaled CFI value (while PCFICH detection/reception is omitted). In this case, adjustment of a CFI value in the normal SF and a CFI value in the specific CF to the same value may be difficult or inefficient (from the viewpoint of the eNB). To solve this, a PDCCH signal may be configured not to be transmitted/received in the specific SF in a state that only one CFI value is designated/signaled. That is, the specific SF can be excluded from a PDCCH bundle. Here, the specific SF may include an SF configured or configurable as an MBSFN SF (irrespective of actual configuration), an SF configured or configurable for PRS transmission (irrespective of actual configuration), SF #1/#6 in TDD, all or some thereof.

Alternatively, a CFI value may be independently designated/signaled per SF or SF set. Accordingly, a UE can operate in a state that different CFI values are used/assumed for respective SFs when detecting/receiving a PDCCH bundle. For example, CFI values can be independently designated/signaled for the normal SF and the aforementioned specific SF. A CFI value can be signaled UE-commonly or UE-specifically through a PBCH, an SIB or an RRC signal.

While the aforementioned proposed method can be applied to all UEs without limitation, the method may be preferably limited to UEs (e.g., MTC UEs) for which repeated channel/signal transmission (e.g., repeated EPDCCH and/or PDSCH transmission) is set/applied for coverage enhancement.

In relation to uplink transmission, an SRS configuration may be changed/added/cancelled for a sleep interval of an MTC UE. In this case, when the MTC UE wakes up, the eNB may need to individually inform the MTC UE of changed SRS configuration information, which may cause significant system overhead. In this situation, the aforementioned proposed method can be similarly applied to a relationship between PUSCH/PUCCH/PRACH transmission configuration and SRS transmission configuration in a case in which PUSCH/PUCCH/PRACH transmission is repeatedly applied. Specifically, Sol A to Sol D can be considered. As described above with reference to FIG. 9, SRS configuration information includes a cell-specific SRS transmission SF set, a cell-specific SRS transmission frequency band and the like. For convenience, an SC-FDMA symbol (e.g., the last SC-FDMA symbol of an SF) available for SRS transmission, that is, configurable for SRS transmission is referred to as "last symbol".

[Sol A]

The SRS configuration information can be UE-commonly signaled through a PBCH, an SIB or an additional broadcast signal/channel (transmitted with a predetermined period). An MTC UE may not map/transmit a PUSCH/PUCCH/PRACH bundle signal to/in the last symbol in an SRS SF corresponding to the SRS configuration information. That is, a PUSCH/PUCCH/PRACH can be rate-matched or punctured in consideration of the last symbol.

[Sol B]

Whether a PUSCH/PUCCH/PRACH signal is mapped/transmitted to/in the last symbol can be signaled UE-commonly or UE-specifically. Accordingly, the MTC UE may or may not map/transmit a PUSCH/PUCCH/PRACH bundle signal to/in the last symbol during PUSCH/PUCCH/PRACH bundle signal transmission. In the case of a PUSCH, signaling can be indicated through a UL grant (a PDCCH or an EPDCCH) which schedules the PUSCH.

[Sol C]

A PUSCH/PUCCH/PRACH bundle signal may not be mapped/transmitted to/in the last symbol all the time irrespective of the actual SRS transmission configuration. In this case, while the number of SC-FDMA symbols available for PUSCH/PUCCH/PRACH transmission is reduced, SRS transmission resources and a degree of freedom of SRS configuration can be secured and system overhead due to SRS configuration information change can be prevented. To secure the number of PUSCH/PUCCH/PRACH symbols, a PUSCH/PUCCH/PRACH signal may be mapped/transmitted even to/in the last symbol. That is, the eNB/UE can repeatedly transmit the PUSCH/PUCCH/PRACH signal on the assumption that SRS transmission/configuration is not present in a PUSCH/PUCCH/PRACH bundle period.

[Sol D]

It is assumed that the UE is aware of the SRS configuration information through the aforementioned signaling or conventional signaling. In addition, it is assumed that repeated PUSCH/PUCCH/PRACH transmission is applied. In this case, to equally maintain an PUSCH/PUCCH/PRACH signal configuration in the corresponding bundle period (so as to facilitate reception combining operation in the eNB), the UE may not map/transmit the PUSCH/PUCCH/PRACH signal to/in the last symbol in the corresponding bundle period (irrespective of actual SRS transmission configuration in a PUSCH/PUCCH/PRACH SF) when SFs belonging to the PUSCH/PUCCH/PRACH bundle include at least one SRS SF. That is, only when no SRS SF is included in the SFs belonging to the PUSCH/PUCCH/PRACH bundle, can the PUSCH/PUCCH/PRACH signal be mapped/transmitted in the corresponding bundle period without rate-matching or puncturing according to SRS.

Alternatively, Sol C can be applied to all channels/signals (including Msg3 and/or normal PUSCH, for example) transmitted/scheduled before the UE receives actual SRS configuration information. For channels/signals transmitted/scheduled after reception of the SRS configuration information, Sol C may be applied to a specific channel/signal (e.g. Msg3), whereas Sol C may be applied or rate-matching or puncturing (e.g. Sol A or Sol D) may be performed according to actual SRS transmission configuration in the case of other channels/signals (e.g. normal PUSCH).

In addition, to omit rate-matching with respect to the SRS, the PUSCH/PUCCH/PRACH signal may not be transmitted in a (cell-specific) SRS SF. That is, the (cell-specific) SRS can be excluded from the PUSCH/PUCCH/PRACH bundle.

In the aforementioned proposed scheme, rate-matching/puncturing according to SRS can be applied irrespective of a PUSCH/PUCCH/PRACH transmission band or applied only when the PUSCH/PUCCH/PRACH transmission band and a cell-specific SRS band overlap.

While the aforementioned proposed method can be applied to all UEs without limitation, the method may be preferably limited to UEs (e.g., MTC UEs) for which repeated channel/signal transmission (e.g., repeated PUSCH and/or PUCCH transmission) is set/applied for coverage enhancement.

Figure 14:
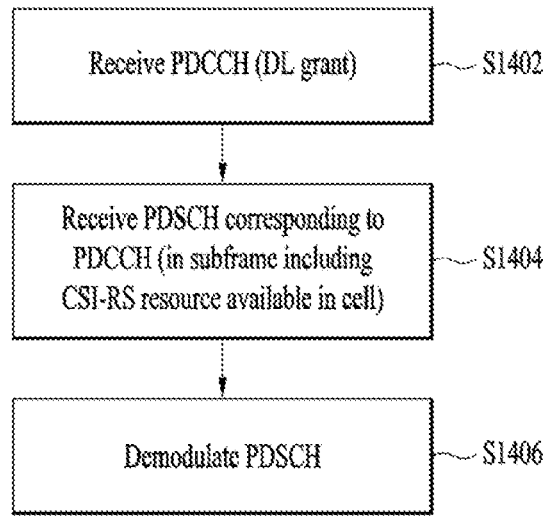
FIG. 14 illustrates a method for acquiring system information according to an embodiment of the present invention.

FIG. 14 illustrates a method for receiving data according to an embodiment of the present invention. Referring to FIG. 14, a UE may receive a PDCCH (S1402). Here, the PDCCH may include a downlink grant. Subsequently, the UE may receive a PDSCH corresponding to the PDCCH. The PDSCH may be received in a subframe including CSI-RS resources available in a cell (S1404). Then, the UE may demodulate the PDSCH in order to obtain data (S1406). Here, when predetermined conditions are satisfied, the PDSCH is demodulated on the assumption that the PDSCH is not transmitted in a CSI-RS resource available in the cell. When the conditions are not satisfied, the PDSCH is demodulated on the assumption that the PDSCH can be transmitted in a CSI-RS resource available in the cell. The present embodiment exemplifies the case of Sol 2 and the aforementioned other methods can be equally/similarly illustrated or implemented.

Figure 15:
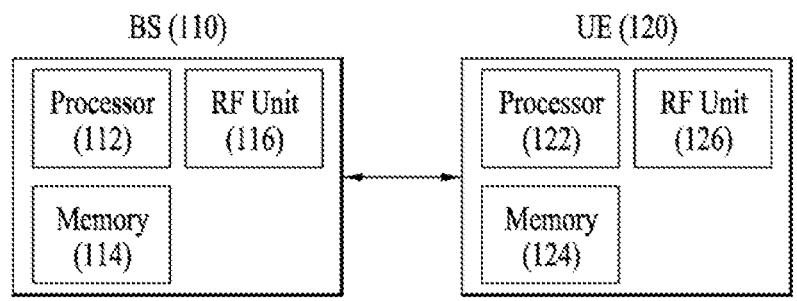
FIG. 15 is a diagram illustrating a base station and a user equipment, which can be applied to one embodiment of the present invention.

FIG. 15 is a diagram illustrating a base station and a user equipment, which can be applied to one embodiment of the present invention.

Referring to FIG. 15, a wireless communication system includes a base station (BS) 110 and a user equipment (UE) 120. In the downlink, the transmitter is a part of the base station 110, and the receiver is a part of the user equipment 120. In the uplink, the transmitter is a part of the user equipment 120, and the receiver is a part of the base station 110. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS), terminal and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a method and apparatus for performing communication when a plurality of carrier types is supported in a wireless communication system.

The invention claimed is:

1. A method for receiving data by a user equipment (UE) in a wireless communication system comprising:
    receiving channel state information reference signal (CSI-RS) configuration information, wherein the CSI-RS configuration information informs the UE on a position of resource elements (REs) for CSI-RS in a configured time interval;
    receiving a set of repeated physical downlink control channels (PDCCHs) on REs in a set of time intervals, wherein the set of repeated PDCCHs have the same control information, and the set of time intervals includes the configured time interval; and
    receiving a physical downlink shared channel (PDSCH) corresponding to the set of repeated PDCCHs,
    wherein, as for a repeated PDCCH in the configured time interval, the same control information is punctured on the REs for CSI-RS.

2. The method of claim 1, wherein information related with the set of time intervals is received through system information.

3. The method of claim 1, wherein the PDSCH is repeated on a set of time intervals.

4. The method of claim 1, wherein the UE is a machine type communication UE.

5. A user equipment (UE) for use in a wireless communication system, the UE comprising:
    a transmitter and receiver; and
    a processor, wherein the processor is configured to control the receiver to:
    receive channel state information reference signal (CSI-RS) configuration information, wherein the CSI-RS configuration information informs the UE on a position of resource elements (REs) for CSI-RS in a configured time interval;
    receive a set of repeated physical downlink control channels (PDCCHs), on REs in the set of time intervals, wherein the set of repeated PDCCHs have the same control information, and the set of time intervals includes the configured time interval, and
    receive a physical downlink shared channel (PDSCH) corresponding to the set of repeated PDCCHs,
    wherein, as for a repeated PDCCH in the configured time interval, the same control information is punctured on the REs for CSI-RS.

6. The UE of claim 5, wherein information related with the set of time intervals is received through system information.

7. The UE of claim 5, wherein the PDSCH is repeated on a set of time intervals.

8. The UE of claim 5, wherein the UE is a machine type communication UE.

9. A method for transmitting data by a base station (BS) in a wireless communication system, comprising:
    transmitting channel state information reference signal (CSI-RS) configuration information, wherein the CSI-RS configuration information informs a UE on a position of resource elements (REs) for CSI-RS in a configured time interval;
    transmitting a set of repeated physical downlink control channels (PDCCHs) on REs in a set of time intervals, wherein the set of repeated PDCCHs have the same control information, and the set of time intervals includes the configured time interval; and
    transmitting a physical downlink shared channel (PDSCH) corresponding to the set of repeated PDCCHs,
    wherein, as for a repeated PDCCH in the configured time interval, the same control information is punctured on the REs for CSI-RS.

10. The method of claim 9, wherein information related with the set of time intervals is transmitted through system information.

11. The method of claim 9, wherein the PDSCH is repeated on a set of time intervals.

12. A base station (BS) for use in a wireless communication system, the BS comprising:
    a transmitter and receiver; and
    a processor, wherein the processor is configured to control the transmitter to:
    transmit channel state information reference signal (CSI-RS) configuration information, wherein the CSI-RS configuration information informs a UE on a position of resource elements (REs) for CSI-RS in a configured time interval;
    transmit a set of repeated physical downlink control channels (PDCCHs), on REs in the set of time intervals, wherein the set of repeated PDCCHs have the same control information, and the set of time intervals includes the configured time interval, and
    transmit a physical downlink shared channel (PDSCH) corresponding to the set of repeated PDCCHs,
    wherein, as for a repeated PDCCH in the configured time interval, the same control information is punctured on the REs for CSI-RS.

13. The BS of claim 12, wherein information related with the set of time intervals is transmitted through system information.

14. The BS of claim 12, wherein the PDSCH is repeated on a set of time intervals.

* * * * *